Aug. 31, 1926. 1,598,063
T. DOWNER
FISH TRAP
Filed Nov. 29, 1924  3 Sheets-Sheet 2

Inventor
Thomas Downer
By his Attorney
Ramsay Hoguet

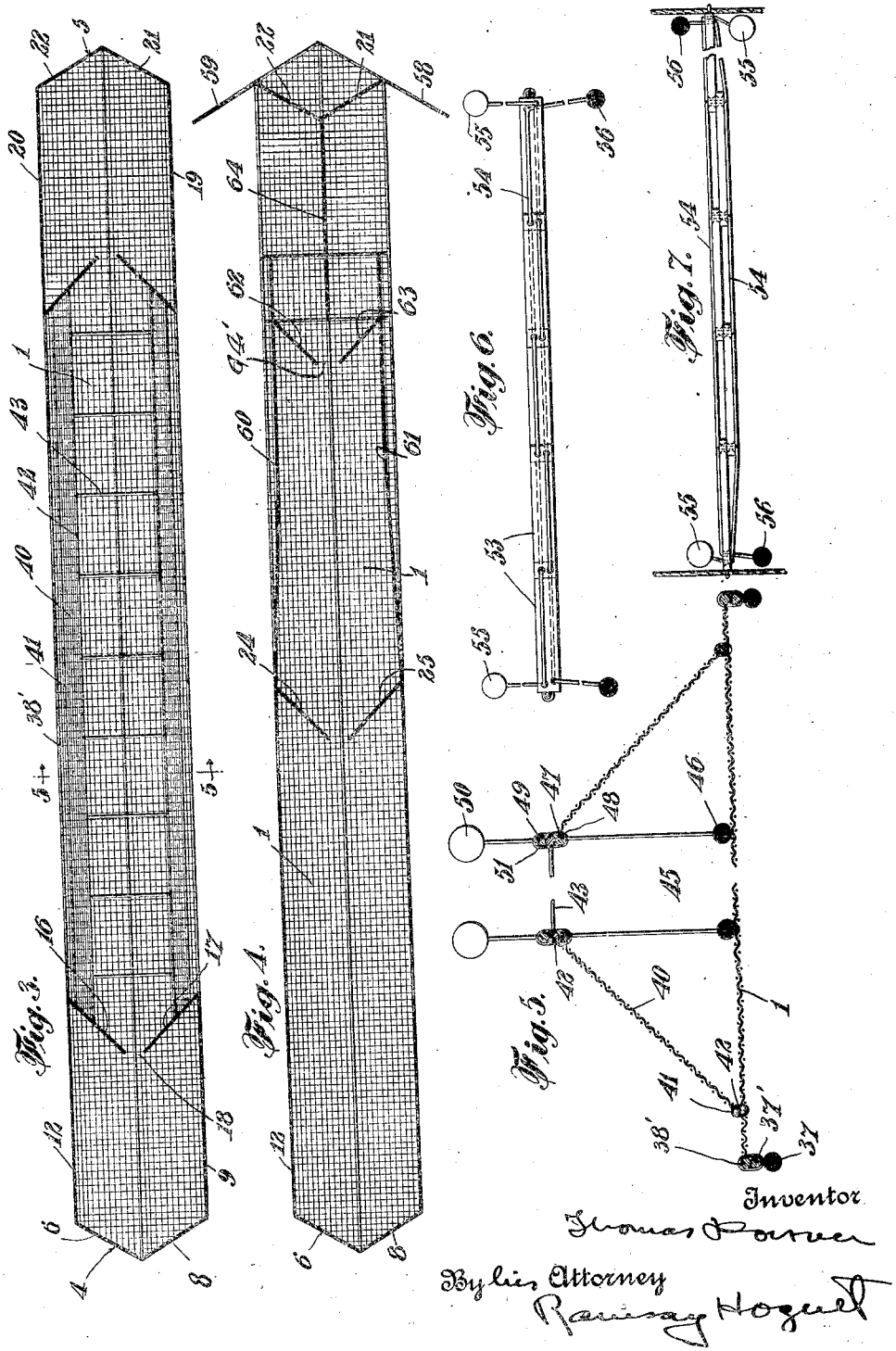

Patented Aug. 31, 1926.

1,598,063

UNITED STATES PATENT OFFICE.

THOMAS DOWNER, OF FOGO, NEWFOUNDLAND, CANADA.

FISH TRAP.

Application filed November 29, 1924. Serial No. 752,944.

This invention relates to a fish trap. An object of the invention resides in the provision of a trap which is so constructed that it may be converted for use in trapping various kinds of fish and fish with various habits, and the trap is so constructed that it is collapsible but will assume and be maintained in its operative position when submerged in water.

In the drawings, which are more or less diagrammatic,

Fig. 3 is a top plan view of the form of the invention shown in Fig. 1,

Fig. 4 is a top plan view of the form of the invention shown in Fig. 2,

Fig. 5 is an enlarged section on line 5—5 of Fig. 3 showing the manner in which the runway walls are positioned, Fig. 6 is a detail of the spreader device, Fig. 7 is a similar view looking at right angles to Fig. 6, and Fig. 8 is a detail showing the manner in which the several sections of the trap are made up.

Figure 1:
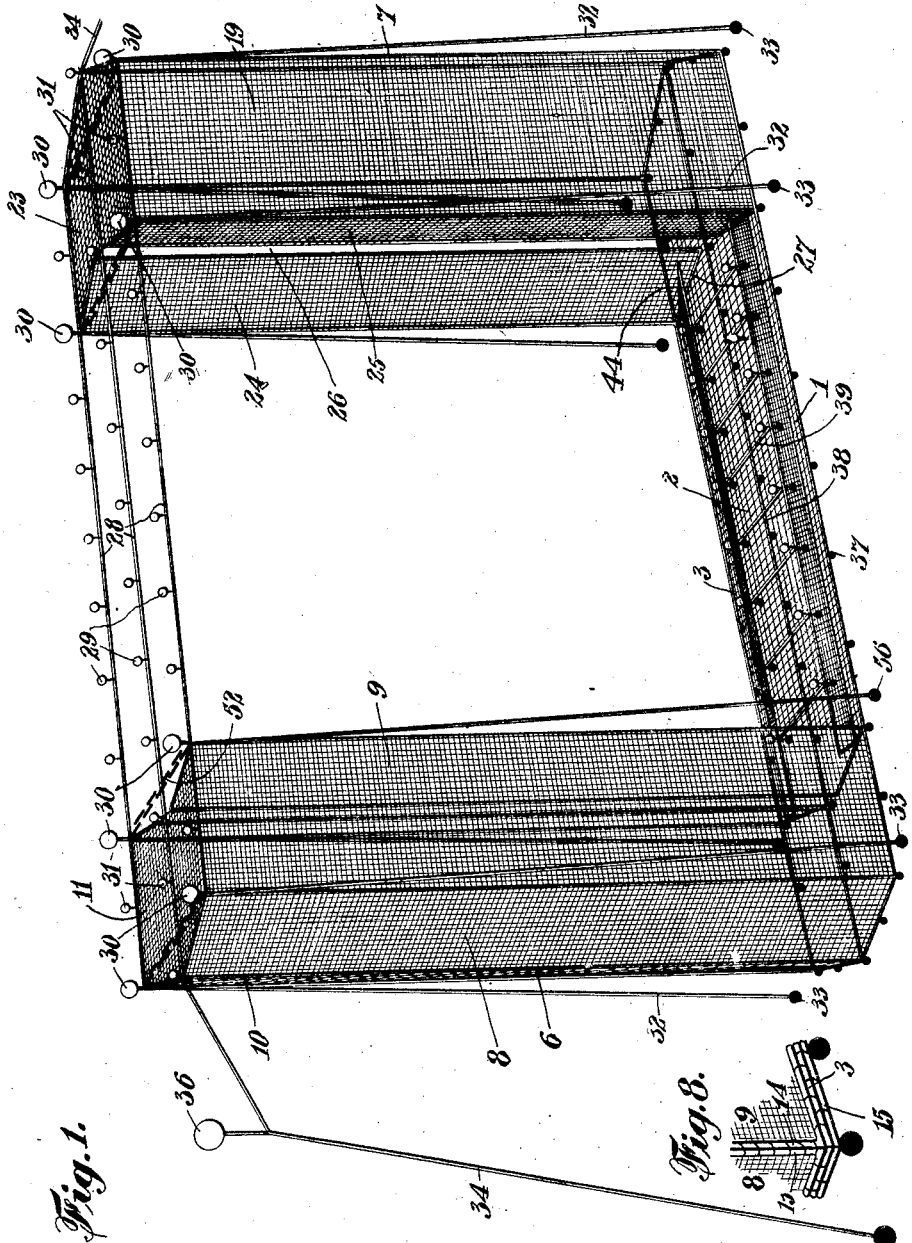
Fig. 1 is a perspective view of one form of the invention.

Referring to the embodiment shown in Fig. 1, there is provided a base 1 which is made of flexible mesh 2 such as rope or twine mesh, being bound at its edges by rope 3. This base 1 as shown in Fig. 3 of the drawing is substantially oblong in plan, with angular ends 4 and 5. On the ends of the base 1 vertical boxes 6 and 7 are detachably mounted. The box 6 is made up of a plurality of panels 8, 9, 10, 11 and 12, which latter panel 12 is arranged opposite the panel 9. Each of these panels consists of a flexible mesh which is bound by a rope as shown in Fig. 8. In this figure, panels 8 and 9 are disclosed, the panel 8 being bound by a rope 13 and the panel 9 by a rope 14. These panels and the corresponding panels on the opposite side of the box are attached to the rope 3 of the base 1 by seizings 15, and the upper panel 11 also is formed by a mesh and is bound by a similar rope. This panel is secured to the upper ends of the panels 8, 9, 10 and 12 by seizings in the manner similar to that in which the latter panels are secured to the base. The panels 9 and 12 are each provided with inturned wings 16 and 17 which terminate short of each other and form a passage 18 for the entrance of the fish into the box.

The box at the opposite end is similarly formed with panels 19, 20, 21, 22 and the upper panel 23 which forms the top of the box, and the panels 19 and 20 are provided with inturned wings 24 and 25 providing a space 26 for the entrance of the fish. The lower ends of these inturned wings 16 and 17 of the box 6, and the lower ends of the inturned wings of the box 7 rest upon the base 1 as at 27, but are unattached thereto. The upper ends of the boxes 6 and 7 are secured together by tie ropes 28 which are provided with floats 29. The upper ends of the boxes 6 and 7 are provided with floats 30 at the corners which serve to maintain the boxes in their vertical positions and are provided with relatively smaller floats 31 which maintain the tops of the boxes in extended positions.

Extending downwardly from the tops of the boxes are moorings 32 which are provided with anchors 33 at their lower ends. These moorings assume in use a position extending outwardly from the boxes so as to assist in the position of the same, and extending from each end of the trap and from the upper end of the box is a mooring 34 having an anchor 35 thereon, which, in mooring a float 36 is interpolated to always maintain the mooring taut. These moorings 34 serve to keep the boxes separated.

The base of the trap is provided with a plurality of weights 37 to anchor the trap, the weights which are arranged around the rope 3 of the base being secured to a rope 37′ which parallels the rope 3 and is attached to the latter by seizings 38′ (see Fig. 5). The base 1 is also provided with a longitudinal rope 38 extending from end to end thereof and with transverse ropes 39 which extend across the base.

The base 1 is also provided with walls 40 which extend inwardly in angular relation to each other, being secured to the mesh of the base by seizings 41. These walls consist of a mesh and binding ropes 42 (see Fig. 5). The walls are spaced apart by tie ropes 43 and their ends are secured at 44 to the wings of the boxes. These walls 40 are provided with a base 1. A runway 45 extending between the boxes 6 and 7 are maintained in operation in their proper positions by weights 46 which are secured to a rope 47 attached to the ropes 42 of the wall by seizings 48. Attached to ropes 49 are floats 50, which ropes 49 are attached by seizings 51 to the ropes 42 of the walls 40. This arrangement of weights and floats insures the proper angular position of the walls 40 as shown in Fig. 5 to form the raceway between the two boxes.

In order that the sides of the boxes may be kept in proper space relation in use, I have provided flexible spreaders 52 at the upper ends of the boxes. These spacers comprise a plurality of rigid sections 53 which are secured together by ropes 54, which ropes extend longitudinally of the sections. On one end of each rope is a float 55 and on the other end a weight 56. The combined action of these floats and weights extends the spreaders 52 and thereby maintains the sides of the boxes in proper space relation.

In operation, the trap being thrown overboard, the weights and floats will cause it to assume the position shown in Fig. 1 and to rest on the bottom. When the fish have entered the boxes 6 and 7 the trap may be withdrawn from the water by raising one end or one box. The raising of this box will cause the mesh of the base 1 to sag since it is held down by weights and the fish will pass from one box below the lower ends of the wings of the sides thereof, into the raceway 45 and thence into the box at the opposite end. The continued upward movement of the trap will cause this latter box containing the fish to reverse itself and thus the fish may be raised from the water.

This particular form is adapted for use particularly in the trapping of codfish, since the cod in striking the walls 40 of the runway will follow the walls upwardly and immediately upon reaching the upper ends thereof will dive and thence pass into the boxes.

However, the several panels of the boxes being detachably secured together and detachably secured to the bottom of the trap, the boxes may be re-arranged to adapt the trap for use in the catching of mackerel, for instance, in which event the trap will be maintained a considerable distance from the bottom.

Figure 2:
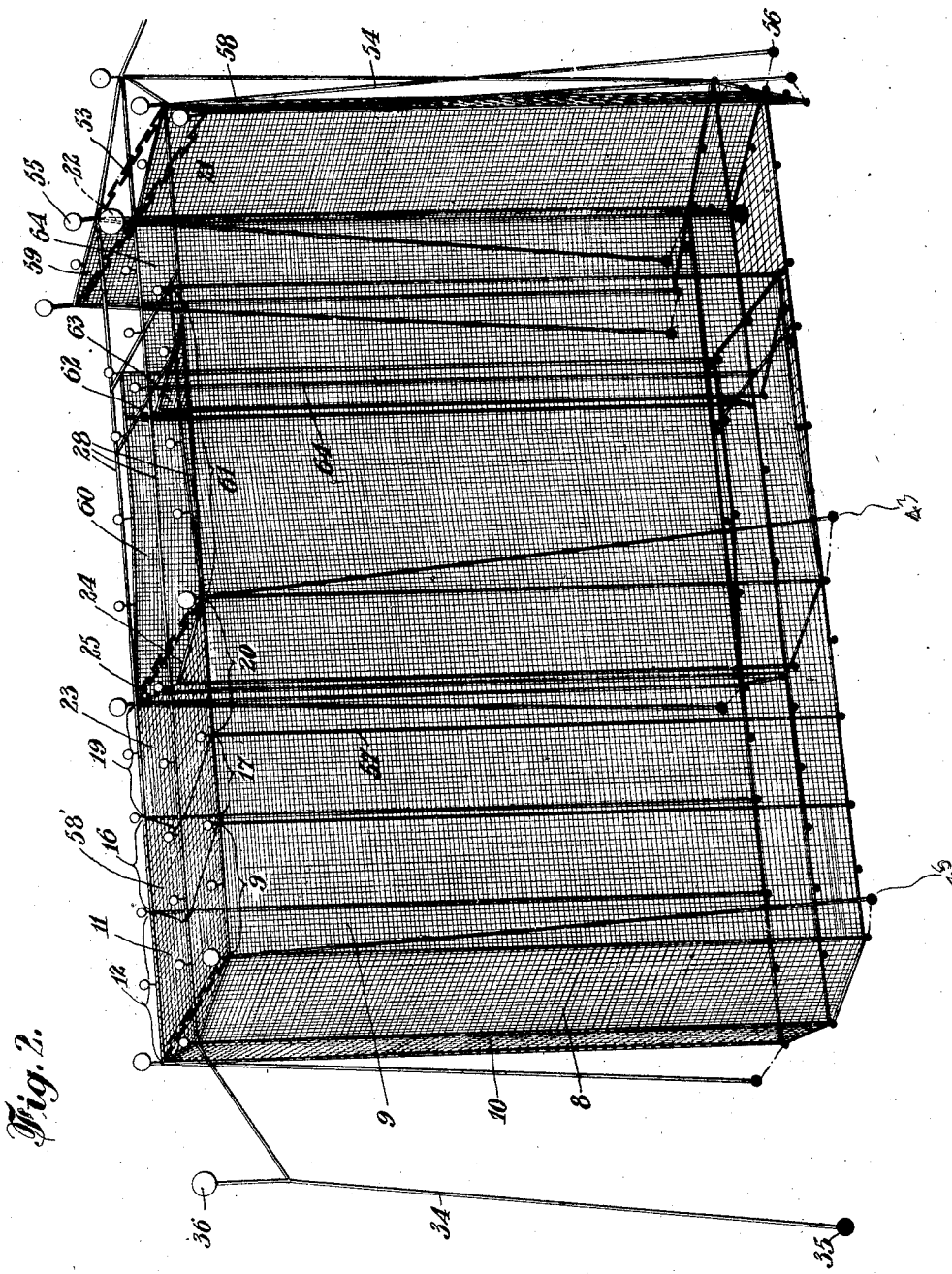
Fig. 2 is a similar view of another form.

When the trap is adapted for this latter use the panels 8 and 10 remain in the same position as in the other form, as do also the panels 9 and 12, but the wings 16 and 17 are moved outwardly and attached to the edges of the base. The panels 19 and 20 of the box 7 are moved, together with the wings 24 and 25 without detaching the latter from the panels, to the opposite end of the base and the edges of the panels 19 and 20 are attached at 57 to the edges of the outwardly turned wings 16 and 17 of the box 6, making in effect a double box with one entrance. The top panel 11 of the box 6 remains in its former relation to the sides of the box and the top panel 23 of the box 7 likewise remains in its former association with this latter box. These two top panels, together with an auxiliary panel 58' which is interposed between the same, form the top of the enlarged box. The end panels 21 and 22 having been detached from the side panels 19 and 20 of the box 7, are reversed in their angular relationship as shown in Figures 2 and 4 and to the edges of these panels 21 and 22 additional panels 58 and 59 are attached, these latter with the panels 21 and 22 forming a baffle. The side panels 60 and 61 extend from the edges of the panels 19 and 20 to which they are attached along the base toward the opposite end of the trap and to these panels 60 and 61 wings 62 and 63 are attached, which wings have a space 64 therebetween to provide an entrance preceding the entrance into the main box. A partition panel 64' is attached to the panels 21 and 22 at their intersection and extends toward but terminates short of the wings 62 and 63, thus providing a double entrance through the opening 64, that is, one from each side of the trap. The trap is weighted by suitably disposed sinkers and is anchored by moorings similar to those described in connection with the other form of the invention and the trap is held in the proper position beneath the surface of the water by the cooperation of these sinkers with suitably disposed floats. Furthermore, the trap is spread by suitable spreaders similar to those described in connection with the other form at the top of the trap and may in addition be located at the bottom thereof.

If the fish enter either of the openings on the sides of the trap between the forward edges of the panels 60 and 61 and the edges of the panels 58 and 59, they naturally follow through the opening 64' into the runway preceding the box and thence through the opening 57 into the box in which they are trapped.

It is of course to be understood that many details in the arrangement of the parts and the construction of the same may be changed without departing from the spirit of the invention or exceeding the scope of the claims.

What I claim is:

1. A fish trap including a substantially flat base, a box detachably secured to the base and extending upwardly therefrom and having a runway inlet, the sides and top of the box being independent of each other and detachably secured together, a runway inlet formed in the base and extending to the box, means for sinking the base and floats for maintaining the box in a vertical position with respect to the base with the runway inlet in said box held open.

2. A fish trap comprising a substantially flat base portion, a box secured to one end of said base portion and extending upwardly therefrom, said box being provided with walls and a top and having a runway inlet, weights for sinking said base, floats and moorings secured to said box for maintaining the latter in a vertical position with the runway inlet open, flexible spreader elements secured to the top of the box, and means secured to said spreader elements and depending therefrom to retain said spreader elements in extended position whereby to maintain the walls of said box in spaced relation.

3. A fish trap comprising a base portion, a box secured to said base portion and extending upwardly therefrom, said box being provided with walls and a top and having a runway inlet, weights for sinking said base, floats and moorings secured to said box to maintain the latter in a vertical position with the runway inlet open, flexible spreader elements secured to the top of the box, a flexible element secured to each end of said spreader elements and depending therefrom, and floats and weights secured to said flexible elements and so arranged as to retain said spreader elements in extended position whereby to maintain the walls of said box in spaced relation.

4. A fish trap including a base, a vertical box substantially higher than the base at each end thereof, means on the base forming a runway inlet between the boxes, means for maintaining the boxes in vertical positions, and weights attached to the base.

5. A fish trap including a base, boxes attached to the ends of the base, said boxes being substantially higher than the base and having entrances into the same, walls mounted on said base and converging upwardly to form a runway connecting the boxes and means for maintaining said walls in said positions.

6. A fish trap comprising a generally flat base, vertical and collapsible boxes oppositely arranged on the base and of substantially greater height than the base, said boxes having on their inner sides converging wings forming an inlet, and a runway inlet open at the top connecting the two bases.

In testimony whereof, I have signed my name to this specification this 21st day of November 1924.

THOMAS DOWNER.